May 21, 1968     J. T. CRAGIN ET AL     3,383,902
INFRARED SIMULATOR

Filed Jan. 6, 1966     3 Sheets-Sheet 1

INVENTORS
JACK T. CRAGIN
MACIEJ J. MAKOWSKI
BY
Richard D. Seibel
ATTORNEY

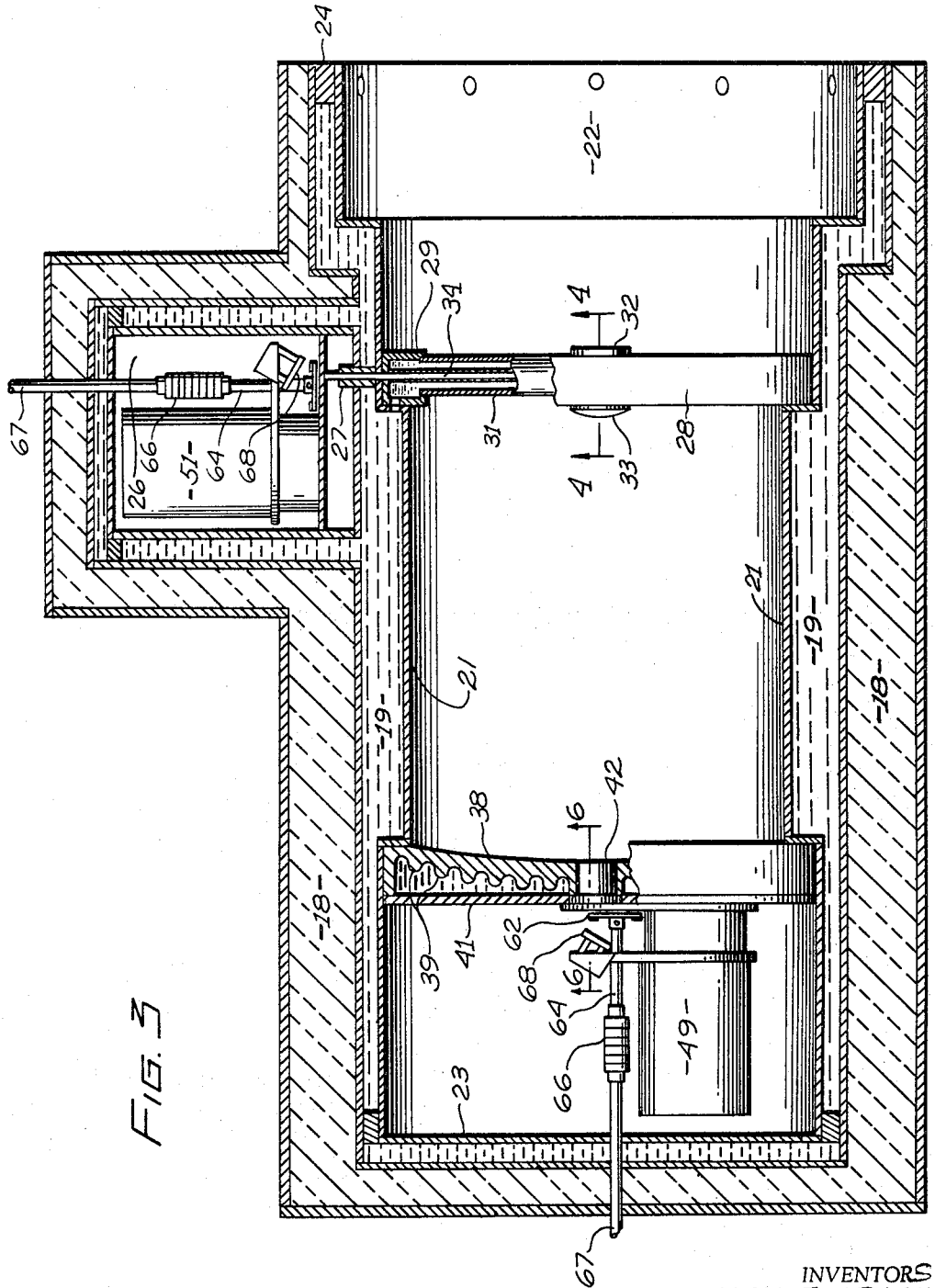

May 21, 1968 J. T. CRAGIN ET AL 3,383,902
INFRARED SIMULATOR

Filed Jan. 6, 1966 3 Sheets-Sheet 3

INVENTORS
JACK T. CRAGIN
MACIEJ J. MAKOWSKI
BY
Richard D. Seibel
ATTORNEY

3,383,902
INFRARED SIMULATOR

Jack T. Cragin, Woodland Hills, and Maciej J. Makowski, Portuguese Bend, Calif., assignors to North American Rockwell Corporation, a corporation of Delaware
Filed Jan. 6, 1966, Ser. No. 519,137
16 Claims. (Cl. 73—1)

This invention relates to a simultator and more particularly relates to apparatus for simulating the characteristics of infrared sources having very little radiant energy.

In recent years photo sensitive semi-conductors have been employed in radiometers for the detection and measurement of infrared radiation and by cooling these sensors to liquid helium temperatures the noise induced by the sensor itself becomes negligible and the ability of the sensor to detect a source of infrared radiation is limited by the general background of infrared radiation that may impinge on the sensor from other sources.

With the advent of such background limited photodetectors useful for the detection of relatively long wave length infrared there has developed a need for simulating equipment having very low background radiation flux for the calibration of these sensors.

It is therefore a broad object of this invention to provide a low background infrared simulator.

Thus in the practice of this invention according to a preferred embodiment there is provided a simulator that is readily cooled to liquid nitrogen temperatures so that a radiometer used therewith is exposed to a background of extremely low flux. Sources of radiant energy are provided in the simulator for illuminating a radiometer with radiant energy having a spectral distribution corresponding to a temperature higher than the temperature of the simulator.

In a preferred embodiment the simultator comprises an opaque thermally insulated cylindrical housing having an internal jacket that is readily filled with liquid nitrogen to bring the entire surface of the interior of the housing to the temperature of liquid nitrogen, that is about 77° Kelvin. A cryogenically cooled optical system is provided in the housing for producing a collimated beam of radiant energy that is useful for calibration and test of a background limited photodetector. There is also provided an optical system for producing a diffusely scattered beam of radiant energy that appears to come from a source coaxial with the collimated beam.

In order to accomplish these objectives in a preferred embodiment a large concave primary mirror having passages therein for liquid nitrogen occupies substantially the full diameter of the cylindrical housing. A convex secondary mirror mounted in front of the primary mirror cooperates therewith so that radiant energy from a point source in front of the secondary mirror is formed into a collimated beam projected from the primary mirror. Radiant enegy simulating radiant energy from a target viewed against the background of space is directed at the secondary mirror through a small opening in the center of the primary mirror so as to appear as a point source.

The radiant energy directed onto the secondary mirror is generated in a black body cavity that is optically aligned with a reflective radiation attenuator so that the intensity of radiation is selectively adjusted. In addition the temperature of the black body cavity is regulated to obtain a desired energy flux. After the radiation is attenuated by the reflective surface it is directed to a convex spherical attenuation mirror with a small radius of curvature. The attenuation mirror causes a very large attenuation of the beam of radiant energy and also appears to optical elements further in the system as a point source of radiation. Radiant energy from this apparent point source is focused by a concave spherical focusing mirror so as to pass through a small opening in the attenuation mirror and fall on the secondary mirror for collimation by the primary mirror. Between the black body cavity and the reflective radiation attenuator is a piezoelectric shutter that provides modulation of the radiation from the black body cavity. This optical system provides a collimated beam of radiation simulating the radiation from a target such as a vehicle in space. A simulator of the sort described can readily simulate the radiant flux from a square meter of material at a range of from 100 to 1000 nautical miles.

Since the background against which a target must be detected may be higher than the background of free space, a background radiation assembly is also provided. This assembly comprises a black body cavity for generating a beam of radiant energy corresponding to a temperature different from the temperature of liquid nitrogen. This radiant energy is directed to a reflective radiation attenuator in the same manner as the target radiation beam. From the radiation attenuator the beam passes to the center of the secondary mirror where a small folding mirror directs the beam through a small central opening in the secondary mirror. The radiation then falls on a diffuse reflecting surface in the center of the primary mirror in the region occulted by the secondary mirror. Radiation reflected from the diffuse reflector therefore appears to come from a source coaxial with the collimated beam. Both the collimated beam and the diffusely scattered radiation are directed to one end of the cylindrical housing so that they can impinge on a radiometer attached thereto for calibration and test.

Thus it is a broad object of the invention to provide an infrared simulator.

It is a further object of this invention to provide a simulator for background limited photodetectors.

It is another object of this invention to provide a controlled flux of infrared radiation.

Other objects and many of the attendant advantages of this invention will be readily appreciated as the same becomes better understood by reference to the following detailed description when considered in connection with the accompanying drawings wherein.

Figure 2:
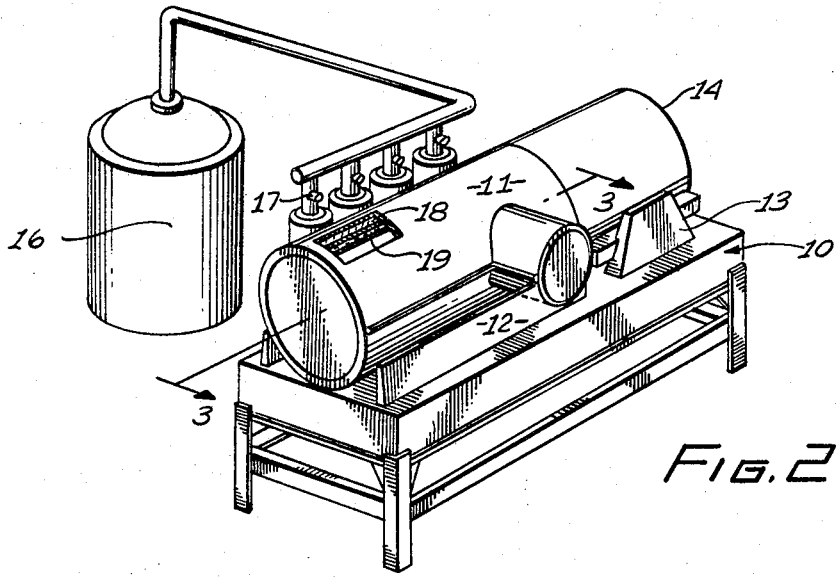
FIG. 2 illustrates a perspective view of a simulator constructed according to the principles of this invention.
Figure 4:
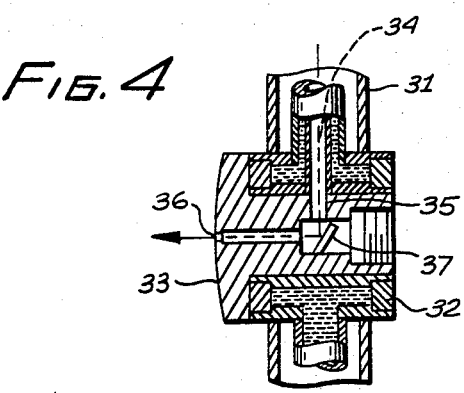
Figure 5:
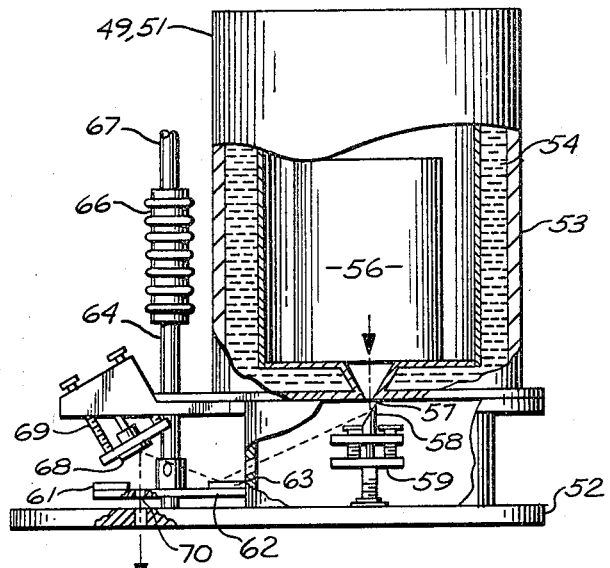
Figure 6:
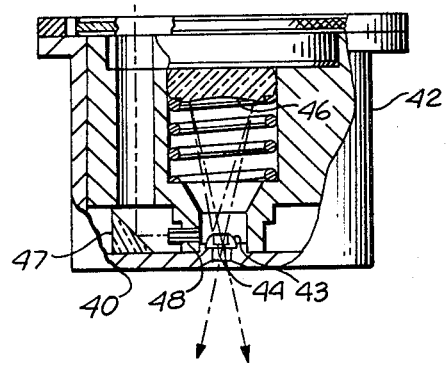
Figure 7:
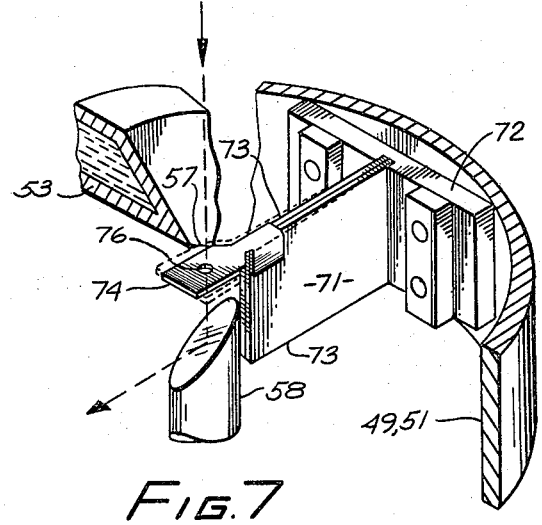

FIG. 3 comprises a horizontal section through the simulator of FIG. 2;

FIG. 4 illustrates a portion of the optical system for obtaining a diffuse background in the simulator of FIG. 2;

FIG. 5 illustrates a radiation assembly useful in the simulator of FIG. 2;

FIG. 6 illustrates a target capsule useful in obtaining a beam of collimated radiant energy in the simulator of FIG. 2; and FIG. 7 illustrates a piezoelectric shutter useful for modulating radiation in the simulator.

Throughout the drawings like numerals refer to like parts.

In recent years there has been developed a family of radiometers or photodetectors that are sensitive to infrared radiation. It has been found that these solid state photodetectors have an extremely low inherent noise level when they are cooled to liquid helium temperatures. Such a photodetector is then limited in its sensitivity by the noise due to general background radiation impinging on the photodetectors and these devices are known as background limited. In order to detect and track satellites or other bodies outside of the earth's atmosphere, it is convenient to employ a tracking instrument using background limited photodetectors as the sensors. The background radiation from free space is in the order of $10^{12}$ photons per square centimeter per steradian per second in the wave length range of about one to thirty microns. With the angle of view of many of the modern background limited sensors the total flux on the photodetector in this wave length region is as low as $10^6$ photons per second. It is found that surfaces at the temperature of liquid nitrogen have an emission of infrared radiation in this wave length region approximating that of free space, thus the characteristic radiation of free space can be simulated by surrounding a radiometer with surfaces having a temperature approximately that of liquid nitrogen.

It is desirable in detecting objects in space to have a sensitivity in the radiometer in the order of $10^6$ to $10^9$ photons per second in the wave length region of about one to 15 or 30 microns so that rather small objects at low temperatures can be detected and tracked at long range. The level of sensitivity becomes apparent when it is recognized that this lower flux corresponds approximately to the flux of infrared radiation emitted by one square meter of ice at a thousand nautical miles from the detector.

Thus in the practice of this invention there is provided a chamber in which all of the surfaces to which a radiometer would be exposed are cooled to substantially liquid nitrogen temperatures. In addition means are provided for illuminating the radiometer with radiant energy having controlled flux levels of $10^6$ to $10^9$ photons per second. Certain other aspects of a simulator for providing infrared radiation to a radiometer for calibration and test are described and claimed in a copending patent application Ser. No. 519,108 entitled "Simulator" filed concurrently herewith by David B. Pollock and Irvin H. Swift and assigned to North American Aviation, Inc., the assignee of this invention.

Figure 1:
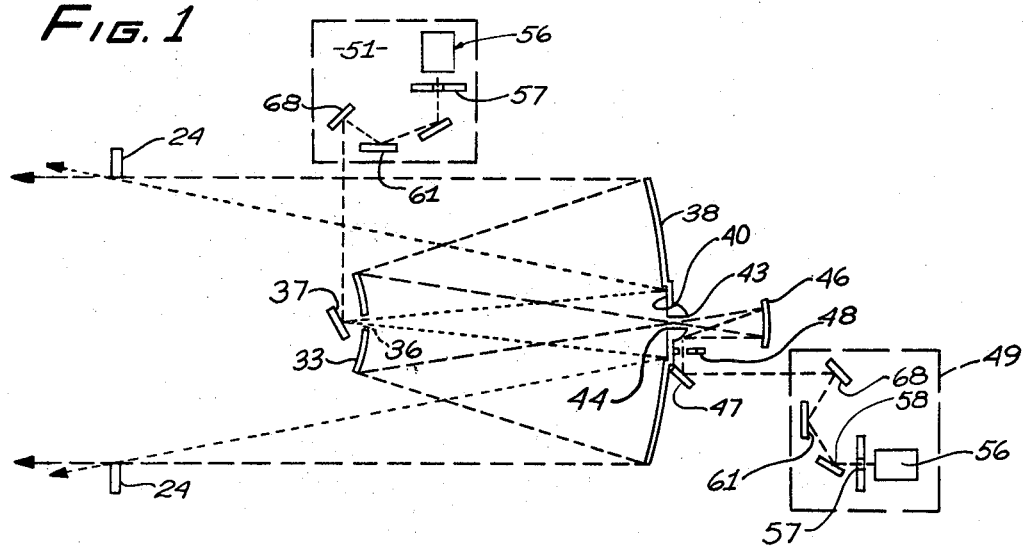
FIG. 1 is a schematic representation of the optical path in a simulator incorporating the principles of this invention.

In order to provide a beam of collimated radiation simulating radiation from a target and a coaxial beam of diffusely reflected radiation, an optical system such as shown schematically in FIG. 1 is employed in a preferred embodiment. As illustrated in this figure, radiation simulating a target is provided by a target radiation assembly 49 and follows an optical path substantially as indicated by the dashed lines. Background radiation is provided by a background radiation assembly 51 and follows an optical path substantially as indicated by the dotted lines. The optical elements shown schematically in FIG. 1 are described in detail hereinafter.

The optical path for radiation simulating a target commences at a black body source 56 in the target radiation assembly 49. The beam of radiation from the source is limited by an aperture 57 and reflected from a folding mirror 58 to a reflective attenuator 61 for reduction of intensity as hereinafter described. Radiation reflected from the attenuator 61 is redirected by folding mirrors 68 and 47 so as to pass through a limiting aperture 48. Thus the divergence of radiation simulating a target is limited by the apertures 57 and 48 respectively.

After passing through the aperture 48 the radiation is reflected from a convex attenuation mirror 43 that has a very small radius of curvature. A small portion of the widely diverging reflected radiation from the attenuation mirror 43 is collected by a concave focusing mirror 46. The small diameter illumination of the attenuation mirror 43 by way of the aperture 48 and the small radius of curvature of the attenuation mirror provide illumination of the focusing mirror 46 from what appears to be a point source at the surface of the attenuation mirror 43. The focusing mirror 46 refocuses this radiation through an aperture 44 in the attenuation mirror. The beam from the focusing mirror 46 then diverges to illuminate the face of a convex secondary mirror 33 where it is reflected to a concave primary mirror 38 and rereflected therefrom as a collimated beam.

Radiation simulating background that might fall on a radiometer is generated in a background radiation assembly 51 and emanates from a black body source 56 through a limiting aperture 57 to fall on a folding mirror 58 from which it is directed to an attenuator 61. Radiation reflected from the attenuator 61 is reflected from folding mirrors 68 and 37 so as to pass through an aperture 36 in the aforementioned secondary mirror 33. Thus the divergence of the beam of radiation simulating background is limited by the apertures 57 and 36 respectively. The slightly diverging radiation passing through the aperture 36 then illuminates a flat diffusely reflecting surface 40 in the center portion of the concave primary mirror 38. Radiation is diffusely scattered from the reflecting surface 40 and forms a diverging beam limited by an aperture formed by a bolting ring 24 hereinafter described. Thus the diffusely reflected radiation simulating a background appears to come from a source coaxial with the beam of collimated radiation simulating a target and both beams extend from the simulator towards a radiometer or the like (not shown).

FIG. 2 illustrates a simulator incorporating the principles of this invention. As illustrated in this embodiment a massive support such as a granite slab 10 is employed for vibration isolation of a simulator 11. The simulator 11 is mounted on the granite slab 10 by a suitable base 12. In addition a radiometer mount 13 is mounted on the granite table adjacent the simulator so that a radiometer 14 can be supported adjacent the simulator and connected thereto to receive radiant energy therefrom. The simulator described and illustrated can be employed with any of a variety of conventional radiometers as will be apparent to one skilled in the art. In order to maintain the simulator at a low temperature, a cryogen such as liquid nitrogen is supplied to the simulator 11 from a conventional storage system 16. The liquid nitrogen level is maintained within the simulator by conventional liquid level controls 17. Such controls are readily set up to maintain a constant liquid nitrogen level within the simulator during long periods of operation without manual attendance.

Within the outer shell of the simulator 11 is a moderate thickness of foam material 18 such as polyurethane that serves as thermal insulation to minimize the flow of heat from the exterior of the simulator to the liquid nitrogen contained therein. Within the insulation 18 is a liquid nitrogen jacket 19 (more clearly illustrated in FIG. 3) that substantially completely surrounds an interior cavity within the simulator. An inner shell 21 forming a portion of the liquid nitrogen jacket defines the cavity within the main body of the simulator. As illustrated in FIG. 3 one end of the simulator, described herein for purposes of illustration as the forward end 22, is open and the other end or rear end 23 is closed. Around the open end 22 is a bolt ring 24 to which is readily secured a conventional radiometer (not shown in FIG. 3) for testing or calibration. Thus in use of the simulator the forward end 22 is closed by a radiometer secured thereto and is not open to the atmosphere thereby preventing condensation of air or water.

The interior walls of the inner shell 21 are preferably provided with a fine buttress thread facing toward the rear end 23 of the housing to minimize stray reflection of radiation. It is also preferred that the inner shell 21 and other portions of the simulator hereinafter described be constructed of an aluminum alloy for high thermal conductivity so that the entire simulator reaches cryogenic temperatures in a short time after adding liquid nitrogen thereto. Aluminum also is a good material of construction for non-optical surfaces since a film of aluminum oxide forms on the surface and helps attenuate infrared radiation by absorption in the thin aluminum oxide film. Optical surfaces are readily produced on aluminum parts by electropolishing, plating with nickel, polishing, and coating with gold for high infrared reflectivity.

A side chamber 26 is provided on one side of the main cavity of the simulator and a small tube 27 is between the side chamber 26 and the main cavity of the simulator through the liquid nitrogen jacket 19 for the transmission of radiant energy as described hereinafter.

A wheel-like support member 28 extends across the main cavity of the simulator opposite the side chamber 26. The rim 29 of the support member 28 is adjacent the liquid nitrogen jacket 19 of the simulator and in fluid communication therewith so that the interior of the rim 29 is also filled with liquid nitrogen during use of the simulator. Four hollow spokes 31 carry liquid nitrogen to a hub 32 in the support member 28 as is more clearly illustrated in FIG. 4. A convex spherical secondary mirror 33 is mounted in the central portion of the hub 32 and due to the presence of liquid nitrogen within the hub, the secondary mirror 33 is also cooled to the temperature of liquid nitrogen. A tubular optical passage 34 within one of the spokes 31 is aligned with the tube 27 through the liquid nitrogen jacket 19 and also with a radial hole 35 in the side of the secondary mirror 33. A small axial opening 36 in the secondary mirror facing toward the rear of the simulator is optically aligned with the passage 34 by a plane mirror 37 mounted within the secondary mirror.

The optical path through a spoke of the support member is between the source of the background radiation 51 and the diffusely reflecting surface 40. The divergence of the beam of radiation therethrough is limited by the apertures 57 and 36 in a preferred embodiment. It will be apparent, however, that a lens system can be used to control the divergence in order to reduce losses and more evenly illuminate the diffuse reflector. Suitable lens materials include zinc selenide which has 75 percent transmittance up to a wave length of 16 microns and cadmium telluride which has 65 percent transmittance up to a wave length of 30 microns. It will also be apparent that a fiber optic system can be employed.

Referring again to FIG. 3, a large concave primary mirror 38 is mounted within the rear portion of the simulator housing so as to have a concave reflective surface optically aligned with the secondary mirror 33 and directed towards the open forward end 22 of the simulator. The concave surface of the primary mirror in a preferred embodiment has a geometry between that of a parabola of revolution and a sphere in order to compensate for spherical aberration introduced in other portions of the optical system. The optical system employing a spherical secondary mirror and a parabolized spherical primary mirror is known as a Dahl-Kirkham design and in a preferred embodiment the primary mirror is 80 percent parabolized, that is, the ordinate at any point is 80 percent of the way between the ordinate of a sphere and that of a parabola. The use of parabolized spherical primary mirror produces a collimated beam of light from a point source as hereinafter described with a blur circle of minimum size. Thus, for example, in a simulator constructed according to the principles of this invention a 12 inch diameter primary mirror is spaced 9.8 inches from a 2.3 inch diameter secondary mirror. A spherical radius of about six inches on the secondary mirror and a twelve inch focal length on the primary mirror gives a resolution or blur circle of about 1.5 minutes of arc from a point source at the center of the primary mirror when the primary has a reflective surface defined by the formula $$X = \frac{Cy^2}{1+\sqrt{1-C^2y^2}} + Dy^4 + Ey^6 + Fy^8 + Gy^{10}$$

where:

$$C = -0.0417$$
$$D = 7.24 \times 10^{-6}$$
$$E = 6.28 \times 10^{-9}$$
$$F = 6.77 \times 10^{-12}$$
$$G = 9.46 \times 10^{-15}$$

The back of the primary mirror 38 has a series of circumferential fins 39 for obtaining good contact with liquid nitrogen and minimizing thermal gradient in the relatively massive primary mirror. A cover plate 41 is secured to the back of the primary mirror 38 to form a chamber therebetween that is filled with liquid nitrogen during use so that the primary mirror is also cooled to liquid nitrogen temperature. The front surface of the primary mirror 38, the secondary mirror 33 and other reflective surfaces hereinafter described in the optical system are coated with a layer of gold after optical polishing so that the reflectivity of the surface is at least 98 percent in the wave length region of 11 microns. The gold provides a highly reflective coating and also prevents the formation of aluminum oxide on the surface which would absorb infrared radiation.

A target capsule 42 is mounted in a central opening in the primary mirror 38. The target capsule 42 has a diameter smaller than the diameter of the secondary mirror 33 so that it occupies a portion of the primary mirror that is normally occulted by the secondary. The surface 40 of the target capsule 42 facing toward the secondary mirror comprises a diffuse reflector. Such a reflector is obtained by sandblasting the surface with number 130 frit or the like followed by coating with gold with a minimum reflectivity of 98 percent in the 11 micron wave length region. This provides effective diffuse scattering of infrared radiation impinging on this surface.

Within the target capsule, as is more clearly illustrated in FIG. 6 there is a small diameter convex spherical attenuation mirror 43 that has a small central opening 44 located at the center of the co-ordinate system defining the parameters of the primary mirror. In a typical simulator constructed according to the principles of this invention, the central opening 44 has a diameter of 0.006 inch. Also within the target capsule 42 and optically aligned with the opening 44 is a concave spherical focusing mirror 46. A folding mirror 47 within the target capsule 42 directs any radiant energy entering the back of the target capsule through a limiting aperture 48 to the spherical attenuation mirror 43. Because of the small radius of curvature of the attenuation mirror, typically 0.1 inch, radiation reflected from the folding mirror 47 to the focusing mirror 46 by the attenuation mirror 43 forms an apparent point source at the surface of the attenuation mirror. The focusing mirror 46 is spaced from the opening 44 and has a suitable curvature to refocus the point source within the opening that is at the center of the primary mirror co-ordinate system. The aperture of the focusing mirror 46 is selected so that the divergence from the apparent point source in the opening 44 produces a beam that substantially fills the face of the secondary mirror 33 so that no stray radiation is present. In addition to forming an apparent point source, the attenuation mirror 43 also serves to spread radiation incident thereon over a large field so that the radiation flux on the focusing mirror from the apparent point source is greatly attenuated over the radiation directed on the attenuation mirror by the folding mirror 47.

Radiant energy simulating the radiant energy from a target is directed on the folding mirror 47 from a target radiation assembly 49. Similarly background radiation within the simulator is directed on the folding mirror 37 within the secondary mirror 33 from a background radiation assembly 51 that is located in the side chamber 26. The target radiation assembly 49 and the background assembly 51 are substantially identical except for the addition of a shutter in the target assembly 49 as hereinafter described. These radiation assemblies provide a source of radiation having a spectral distribution corresponding to a temperature different from the temperature of the walls of the simulator, that is, liquid nitrogen temperature in a preferred embodiment.

FIG. 5 illustrates a radiation assembly typical of either the target or background radiation assemblies 49 and 51 respectively. As illustrated in FIG. 5 the radiation assembly comprises a mounting flange 52 for securing the assembly to other portions of the simulator. Mounted on the mounting flange 52 is a source housing 53 that includes a liquid nitrogen jacket 54 surrounding an inner chamber in which a black body source 56 is contained. The black body source 56 is shown schematically in FIG. 5 and can comprise any of a number of standard black body sources such as are readily available commercially. A suitable black body source has been found to be Electro-Optical Industries Model No. 202 Black Body which comprises an electrically heated black cavity that is readily temperature controlled in the temperature range of liquid nitrogen up to a few hundred degrees Kelvin. A radiation source such as described in the aforementioned copending application can also be employed as a black body source.

A limiting aperture 57 in the housing 53 is adjacent the black body source 56. The liquid nitrogen jacket 54 extends to the edges of the limiting aperture 57 so that the aperture is cooled to liquid nitrogen temperature during use of the simulator thereby minimizing radiation emitted by the edges of the aperture. In a typical simulator constructed according to the principles of this invention the limiting aperture 57 has a diameter of approximately 0.03 inch. Radiant energy from the black body source passes through the limiting aperture 57 and is reflected by a folding mirror 58 that is supported from the mounting flange 52 by a conventional three point adjustable support 59. The folding mirror 58 directs radiant energy from the black body source to a selective radiation attenuator 61.

The attenuator 61 comprises a disk 62, the upper surface of which is divided into a series of sectors 63, each of which sectors has a mutually different reflectivity. Such a disk is readily prepared by optically polishing an aluminum disk followed by gold coating of the individual sectors 63. Gold is readily coated on the aluminum with a reflectivity of at least 98 percent in the wave length range of about 11 microns and it is readily possible by slight contamination of the gold with sulphur, tellurium or the like, to produce a reflective surface having a selected reflectivity less than 98 percent. It is preferred to have a range of reflectivities of from about one or two percent up to at least 98 percent on the various sectors of the disk 62. A reflective attenuator is preferred to minimize the possibility of energy absorption that would raise the temperature and raise the amount of radiation emitted by the attenuator. Additionally absorptive attenuators of controlled absorption in the infrared region are difficult to obtain.

The attenuator disk 62 is mounted on an aluminum shaft 64 that is connected to a stainless steel bellows type coupling 66. The coupling is in turn connected to a shaft 67 that extends through the liquid nitrogen jacket 19 (not shown in FIG. 5) and outside of the simulator so that the disk 62 can be manually rotated to interpose any selected sector 63 in the beam of radiation in the assembly. A bellows type coupling 66 is employed for ease of assembly of the simulator and to minimize heat transfer along the length of the shaft supporting the attenuator so that the disk 62 is at liquid nitrogen temperature and has no substantial emission in the infrared region that would interfere with operation of the simulator.

Radiation reflected by a sector of the selective attenuator 61 is directed to a folding mirror 68 that is secured to the assembly by a conventional three point adjustable suspension 69 for ease of alignment. Radiant energy reflected by the folding mirror 68 is directed through a hole 70 in the attenuator and in turn to either the folding mirror 47 in the target capsule 42 illustrated in FIG. 6 in the case of the target radiation assembly 49 or through the optical passage 34 in the support member 28 of FIG. 3 in the case of the background radiation assembly 51. It is found that in the background radiation assembly that a pinhole type of radiation attenuator can also be employed.

The target radiation assembly 49 differs from the background radiation assembly 51 by the addition in the former of a piezoelectric shutter assembly 71 that is mounted within the target radiation assembly between the limiting aperture 57 and the folding mirror 58. As illustrated in FIG. 7, the shutter assembly comprises an aluminum support block 72 into which is cemented a conventional piezoelectric bimorph 73. Mounted on the end of the bimorph 73 is a thin metal shutter plate 74 with a small diameter opening 76. Application of a voltage to the bimorph bends the bimorph 73 so that the shutter plate is moved in front of the limiting aperture 57. In one position the shutter plate 74 occults the limiting aperture 57 and in another position the opening 76 is adjacent the limiting aperture so that radiation can pass therethrough. Thus by applying an alternating voltage from a conventional oscillator (not shown) to the bimorph, the shutter plate can be oscillated in front of the limiting aperture thereby chopping or modulating the radiation in the target radiation assembly.

In a typical operation of the simulator the bimorph is driven so that the radiation is modulated at less than a few thousand cycles per second. It is preferred to employ a piezoelectric shutter in the simulator so that no mechanical motion need be transmitted through the liquid nitrogen jacket and only electrical connections need be made. In addition the piezoelectric shutter operates without generating any electrical interference that might interfere with calibration of a radiometer. In addition, the rate of modulation provided by the piezoelectric shutter is readily varied to suit the conditions of the test being conducted. By modulating the radiation from the target radiation assembly a radiometer under test can readily distinguish between radiation from a simulated larger and radiation from the background.

To recapitulate the path of radiation in the simulator: the radiation simulating a target within the field of view of a radiometer is generated in a black body source 56 within the target radiation assembly 49 and passes through the cryogenically cooled limiting aperture 57. It is modulated by the piezoelectric shutter 71 in front of the aperture and redirected by the folding mirror 58. The radiation then reflects off a selected sector 63 of the radiation attenuator 61 so that the intensity of the radiation is attenuated to a selected value. The attenuated radiation is reflected from the folding mirror 68 to the folding mirror 47 within the target capsule 42. The folding mirror 47 directs the radiation through a limiting aperture 48 onto a portion of the spherical attenuation mirror 43 that has a small radius of curvature. Thus the attenuation mirror is illuminated by a beam having a small divergence limited by the apertures 57 and 48. It will be apparent that a parallel or slightly converging beam could also be employed. The attenuation mirror 43 spreads the radiation over a large area within the target capsule thereby causing substantial attenuation and also because of the small limiting apertures 48 and 57 the radiation reflected from the attenuation mirror appears substantially at a point source. The radiation reflected from the point source apparently at the surface of the attenuation mirror 43 is focused by the focusing mirror 46 so as to pass through the small opening 44 in the attenuation mirror. The opening 44 is at the center of the co-ordinate system defining the parameters of the primary mirror 38. Thus the target optical system to this point generates a modulated beam of radiation appearing to come from a point source at the center of the co-ordinate system defining the primary mirror.

The beam of radiation from the apparent point source in the opening 44 has a divergence such that it substantially fills the face of the secondary mirror 33. The convex spherical secondary mirror further spreads the radiation from the apparent point source to substantially fill the reflective surface of the large primary mirror 38. The parabolized spherical primary mirror in turn reflects the radiation as a collimated beam directed toward the open forward end 22 of the simulator. In a typical simulator constructed according to the principles of this invention a collimated beam approximately 12 inches in diameter is produced with a small portion occulted by the secondary mirror 33 and the support member 28.

Radiation from the background radiation assembly 51 is also generated in a black body source 56 and directed through a cryogenically cooled limiting aperture 57. The radiation is then reflected from a folding mirror 58 onto a selective radiation attenuator 61 in the same manner as in the target radiation assembly. The radiation then is reflected by a folding mirror 68 and directed through the tube 27 through the liquid nitrogen jacket 19. The radiation then passes through the optical passage 34 through a spoke 31 of the support member 28 and to the folding mirror 37 within the secondary mirror 33. The folding mirror 37 redirects the radiation through the opening 36 in the face of the secondary mirror and onto the front surface of the target capsule 42. The divergence of the beam of radiation from the background radiation assembly is limited by the limiting aperture 57 and the size of the opening 36 in the face of the secondary mirror 33. The background radiation from the opening 36 is scattered by the diffusely reflecting front surface 40 of the target capsule 42. Some of the radiation reflected from the diffuse reflector passes directly to the open end 22 of the simulator whereas other radiation is reflected to the secondary mirror 33 thence to the primary mirror 38 where it is reflected to the open end 22 of the simulator. Since the background radiation is reflected from the diffuse reflective surface of the target capsule 42 in the center of the primary mirror 38, it appears to come from a source coaxial with the collimated beam of target radiation from the primary mirror. The angular spread of radiation from the diffuse reflector that reaches the open end of the simulator is approximately two degrees on either side of the axis of the collimated beam. Other radiation diffusely reflected from the target capsule 42 is attenuated by the fine thread on the inner shell 21.

A radiometer secured to the open end 22 of the simulator thus is illuminated by a collimated modulated beam of radiation from the target radiation assembly and also a coaxial diffusely scattered beam of background radiation having a total angular spread of about four degrees. In any given operation of the simulator herein described and illustrated, a minimum of radiation is emitted by the elements of construction and the optics since all of the members viewed by a test radiometer are cooled to liquid nitrogen temperature. Radiation simulating a target is in each instance provided by heating the black body 56 in the target radiation assembly 49 to a temperature above that of liquid nitrogen. In some tests, but necessarily not all, additional background radiation can be provided by heating the black body 56 in the background radiation assembly 51 to a temperature above that of liquid nitrogen.

In order to operate a simulator constructed according to the principles of this invention a conventional radiometer is secured to the bolting ring 24 on the open end of the simulator. It is preferred to supply thermal insulation around the interconnection to minimize stray radiation in the simulator. After the radiometer is connected the interior of the simulator and the radiometer are preferably purged with dry nitrogen gas or helium to prevent the formation of condensed air or water. When air has been purged from the interior of the simulator the liquid nitrogen jacket 19 and other passages accommodating liquid nitrogen are filled and the radiometer permitted to come to thermal equilibrium. It is found that thermal equilibrium is readily obtained in the various elements of the simulator in a time of about one hour. Thermocouples can readily be provided as may be desired on various elements of the simulator in order to assure that thermal equilibrium has been reached before any measurements are made. In order to calibrate a radiometer the selective attenuator 61 is rotated so as to place a selected attenuating sector 63 within the optical path. The black body 56 in the target radiation source is heated to a selected temperature and the piezoelectric shutter assembly driven at a desired rate in order to obtain a beam of modulated target simulating radiation of a selected total flux in the wave length region from about one to fifteen microns. If it is desired the background radiation impinging on a radiometer can also be increased by warming the black body source in the background radiation assembly 51 to a temperature above that of liquid nitrogen. The total flux level in the wave length range of interest is controlled by controlling the temperature of the black body source and the attenuation of the beam by the attenuator 61.

For a radiometer that is sensitive to the total flux of radiation in the wave length region of about one to fifteen microns, a simulator as described is able to simulate the radiation from a one square meter target at about 150 to 600 degrees Kelvin at a range of from about 100 to 1000 nautical miles from the radiometer.

It will be apparent that many modifications and variations of the simulator can be made by one skilled in the art in light of the above teachings. It is therefore to be understood that within the scope of the appended claims the invention may be practiced otherwise than as specifically described.

What is claimed is:

1. A simulator comprising:
    an opaque housing at a first substantially uniform temperature;
    means for generating a collimated beam of radiant energy in said housing having a spectral distribution corresponding to a second temperature different from said first temperature;
    means for generating a background flux of radiant energy in said housing having a spectral distribution corresponding to a temperature different from said first temperature; and
    means for reflecting said background flux coaxially with the collimated beam.

2. A simulator as defined in claim 1 wherein said first temperature is the temperature of a liquid cryogen and said housing comprises a passage for containing a liquid cryogen.

3. A simulator as defined in claim 1 wherein said means for generating a collimated beam comprises:
    a source of radiant energy having a spectral distribution corresponding to the second temperature;
    means for selectively varying intensity of radiant energy from said source; and
    means for modulating radiant energy from said source at a rapid rate.

4. A simulator as defined in claim 1 wherein said means for generating a collimated beam comprises:
    an apparent point source of radiant energy having a spectral distribution corresponding to the second temperature;
    a convex secondary mirror optically aligned with said apparent point source; and a concave primary mirror optically aligned with said secondary mirror, said secondary mirror being optically interposed between said apparent point source and said primary mirror.

5. A simulator comprising:
   an opaque housing;
   means for cooling said housing to a cryogenic temperature;
   a relatively larger primary concave mirror axially aligned in said housing including a central opening;
   a relatively smaller secondary convex mirror in said housing optically aligned with and facing said primary mirror; and
   means for generating radiant energy from an apparent point source aligned with the central opening in said primary mirror, said radiant energy having a spectral distribution corresponding to a temperature different from the temperature of said housing.

6. A simulator as defined in claim 5 wherein said means for generating radiant energy comprises:
   a target capsule in the central opening of said primary mirror including a small axial aperture;
   a convex spherical attenuation mirror having a small radius of curvature in said target capsule;
   means for illuminating a portion of said attenuation mirror with a beam of radiant energy having small divergence; and
   means for focusing radiant energy reflected from said attenuation mirror through the small aperture in said target capsule.

7. A simulator as defined in claim 6 wherein said means for generating radiant energy further comprises:
   a black body radiation source of controllable temperature;
   a reflective radiation attenuator having a plurality of reflective surfaces with mutually different reflectivities; and
   means for interposing a selected reflective surface on said attenuator in optical alignment with said radiation source and also in optical alignment with said attenuation mirror.

8. A simulator as defined in claim 5 further comprising:
   a diffusely reflecting flat surface in the central portion of said primary mirror; and
   means for illuminating said reflecting surface with radiant energy having a spectral distribution different from the temperature of said housing.

9. A simulator as defined in claim 8 wherein said means for illuminating further comprises:
   a black body radiation source of controllable temperature;
   an optical path leading from said radiation source to an aperture in said secondary mirror aligned with said diffusely reflecting surface; and
   means for interposing a surface having a selected reflectivity in optical alignment with said radiation source and said optical path.

10. An optical system comprising:
    a convex spherical mirror having a small radius of curvature and a small passage therethrough;
    means for illuminating a portion of said convex mirror with a beam of radiant energy having no more than a small divergence; and
    a concave mirror facing said convex mirror for focusing a portion of the radiant energy reflected from said convex mirror through the small passage in said convex mirror to form a focused image as an apparent point source.

11. An optical system as defined in claim 10 further comprising:
    a convex secondary mirror optically aligned with said concave mirror for reflecting radiant energy passing through the focused image into a beam with greater divergence than the beam passing through the focused image; and
    an apertured concave primary mirror optically aligned with said convex secondary mirror for reflecting radiant energy therefrom in a collimated beam, said secondary mirror being optically interposed between the apparent point source and said secondary mirror.

12. In a radiation simulator, a cryogenically cooled optical system having elements as defined in claim 10 wherein said means for illuminating comprises a black body source having a temperature higher than the temperature of other elements of the cryogenically cooled optical system.

13. A simulator comprising:
    an opaque housing including a passage for a liquid cryogen for cooling said housing to a cryogenic temperature, said housing having an open forward end and a closed rear end;
    a relatively larger primary concave mirror axially aligned in said housing and facing toward the open forward end thereof including an internal passage for a liquid cryogen for cooling said primary mirror to a cryogenic temperature, and a central opening in said primary mirror;
    a relatively smaller secondary convex mirror axially aligned in said housing so as to be optically aligned with and facing said primary mirror, including a central opening in said secondary mirror;
    a support member supporting said second mirror in said housing including an optical passage running from a side of said housing to the central opening in said secondary mirror, said support member including a cooling passage for a liquid cryogen for cooling said support member and said secondary mirror to a cryogenic temperature;
    a folding mirror in the central opening in said secondary mirror optically aligned with the optical passage in said support member and with said primary mirror;
    a target capsule in the central opening of said primary mirror having substantially the same diameter as said secondary mirror and including a substantially flat diffusely reflecting surface facing toward said secondary mirror and optically aligned therewith, and including a small central opening in the diffusely reflecting surface;
    a concave spherical focusing mirror in said target capsule optically aligned with said secondary mirror and having a focus in the small central opening in the diffusely reflecting surface;
    a convex spherical attenuation mirror having a small radius of curvature in said target capsule and optically aligned with said focusing mirror, and including a central opening in said attenuation mirror aligned with the opening in the diffusedly reflecting surface;
    a black body target radiation assembly optically aligned with said attenuation mirror for directing radiant energy thereto; and
    a black body background radiation assembly optically aligned witht the optical passage in said support member for directing radiant energy therethrough.

14. A simulator as defined in claim 13 wherein said target radiation assembly and said background radiation assembly each comprise:
    a black body radiation source of controllable temperature;
    a reflective radiation attenuator having a plurality of reflective surfaces with mutually different reflectivities; and
    means for interposing a selected reflective surface on said attenuator in optical alignment with said radiation source and with said attenuation mirror.

15. A simulator as defined in claim 14 further comprising:

a cryogenically cooled limiting aperture adjacent each of said black body radiation sources and in optical alignment therewith; and a shutter in said target radiation assembly adjacent the limiting aperture in said target radiation assembly, said shutter comprising a piezoelectric bimorph mounted for bending in a direction normal to the path of radiation from said limiting aperture and a vane secured to said bimorph for occulting the path of radiation in response to an electric signal.

16. A simulator as defined in claim 15 wherein said reflective radiation attenuator and said means for interposing in said target radiation assembly comprises:

a disc having a flat surface optically aligned with said limiting aperture and with said attenuation mirror, said flat surface having a plurality of sectors thereon, each of said sectors having a mutually different infrared reflectivity; and a shaft secured to said disk and extending out of said housing so that rotation of said shaft interposes mutually different reflective sectors of said disk between said limiting aperture and said attenuation mirror.

References Cited

UNITED STATES PATENTS

| | | | |
|---|---|---|---|
| 2,985,783 | 5/1961 | Garbuny et al. | 250—83.3 |
| 3,179,802 | 4/1961 | Hall | 250—83.3 |
| 3,187,583 | 6/1965 | Webb | 73—432 |
| 3,287,956 | 11/1966 | Dreyfus et al. | 73—1 |
| 3,264,467 | 8/1966 | Mann et al. | 73—432 |

LOUIS R. PRINCE, *Primary Examiner.*

S. CLEMENT SWISHER, *Assistant Examiner.*